United States Patent [19]
Miyata et al.

[11] Patent Number: 5,888,160
[45] Date of Patent: Mar. 30, 1999

[54] CONTINUOUSLY VARIABLE TRANSMISSION

[75] Inventors: Shinji Miyata; Hisashi Machida; Hiroyuki Itoh, all of Fujisawa, Japan

[73] Assignee: NSK Ltd., Tokyo, Japan

[21] Appl. No.: 966,356

[22] Filed: Nov. 7, 1997

[30] Foreign Application Priority Data

Nov. 13, 1996 [JP] Japan .................................. 8-301677

[51] Int. Cl.⁶ .................................................. F16H 37/02
[52] U.S. Cl. ................................................................. 475/216
[58] Field of Search ..................................... 475/215, 216

[56] References Cited

U.S. PATENT DOCUMENTS

| | | | |
|---|---|---|---|
| 3,244,025 | 4/1966 | Francisco | 475/216 |
| 4,628,766 | 12/1986 | De Brie Perry | 475/216 |
| 4,691,592 | 9/1987 | De Brie Perry | 475/216 |
| 4,872,371 | 10/1989 | Fellows | 475/216 |
| 5,238,460 | 8/1993 | Esaki et al. | 475/216 |
| 5,453,061 | 9/1995 | Fellows | 475/216 |
| 5,820,510 | 10/1998 | Ueda et al. | 475/216 |

FOREIGN PATENT DOCUMENTS

| | | |
|---|---|---|
| 0 078 124 | 5/1983 | European Pat. Off. . |
| 62-71465 | 5/1987 | Japan . |
| 1-169169 | 7/1989 | Japan . |
| 1-312266 | 12/1989 | Japan . |
| 1 525 861 | 9/1978 | United Kingdom . |
| 2 100 372 | 12/1982 | United Kingdom . |

*Primary Examiner*—Dirk Wright
*Attorney, Agent, or Firm*—Shapiro and Shapiro

[57] ABSTRACT

A load applied to the constituent member of a toroidal type continuously variable transmission is mitigated to thereby improve the durability thereof. During low speed running, a clutch for low speed is connected and a clutch for high speed and a clutch for backward movement are disconnected. During high speed running, the clutch for high speed is connected and the clutch for low speed and the clutch for backward movement are disconnected. During the high speed running, a torque is applied to the output side disc of the toroidal type continuously variable transmission. This torque becomes smaller as the transmission ratio as a whole is displaced to the high speed side. Correspondingly thereto, the load applied to the constituent member of the toroidal type continuously variable transmission can be mitigated.

2 Claims, 6 Drawing Sheets

FIG. 7 PRIOR ART

CONTINUOUSLY VARIABLE TRANSMISSION

BACKGROUND OF THE INVENTION

1. Field of the Invention

This invention relates to improvements in a continuously variable transmission incorporating therein a toroidal type continuously variable transmission utilized, for example, as a transmission for an automobile, and particularly to a continuously variable transmission in which the durability of the constituent members of a toroidal type continuously variable transmission can be secured.

2. Related Background Art

Figure 6:
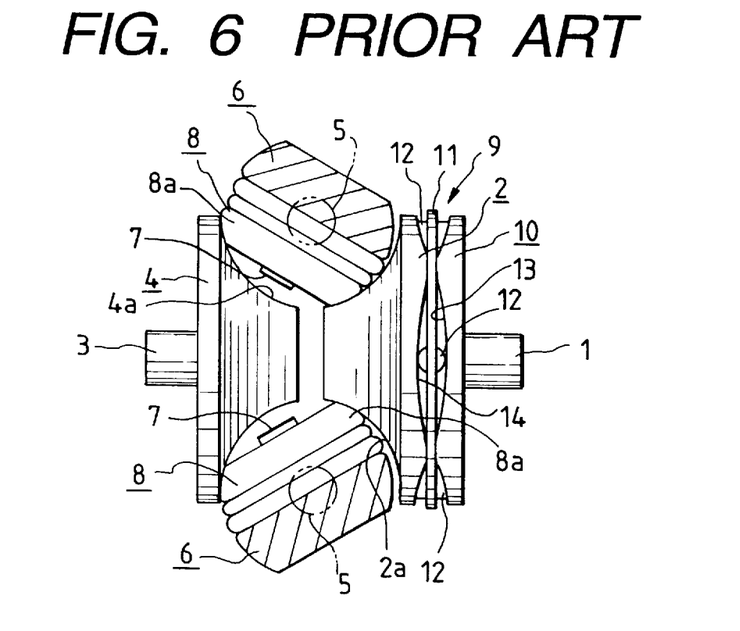
FIG. 6 is a fragmentary cross-sectional side view showing a conventional toroidal type continuously variable transmission also applicable to the continuously variable transmission of the present invention in the state of maximum deceleration.
Figure 7:
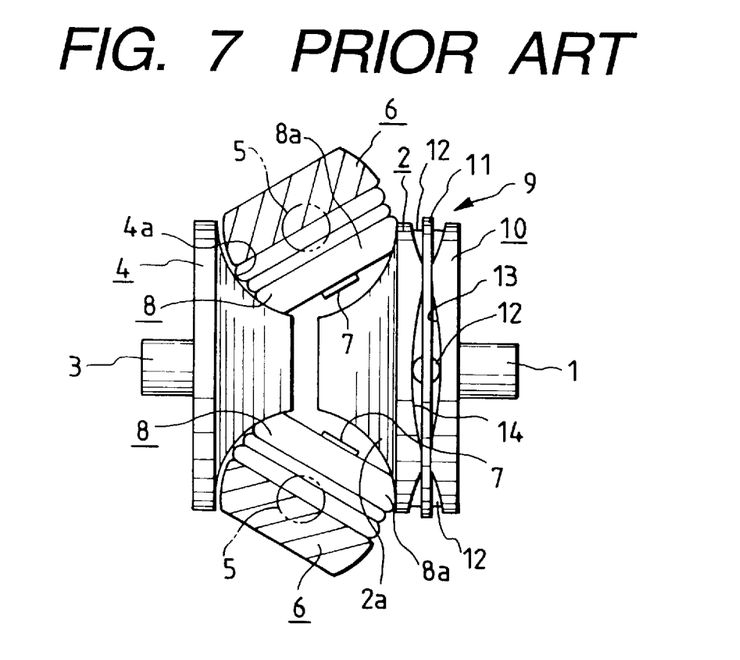
FIG. 7 is a fragmentary cross-sectional side view showing the toroidal type continuously variable transmission of FIG. 6 in the state of maximum acceleration.

It has been studied to use a toroidal type continuously variable transmission as schematically shown in FIGS. 6 and 7 of the accompanying drawings, for example, as a transmission for an automobile. This toroidal type continuously variable transmission is such that as disclosed, for example, in Japanese Laid-Open Utility Model Application No. 62-71465, an input side disc 2 which is a first disc is supported concentrically with an input shaft 1 and an output side disc 4 which is a second disc is fixed to the end portion of an output shaft 3 disposed concentrically with the input shaft 1. Inside a casing containing the toroidal type continuously variable transmission therein, there are provided trunnions 6 pivotally movable about pivots 5 lying at twisted positions relative to the input shaft 1 and the output shaft 3.

The pivots 5 are provided on the outer sides of the opposite end portions of each of these trunnions 6. Also, the base end portions of displacement shafts 7 are supported on the central portions of the trunnions 6, and the trunnions 6 are pivotally moved about the pivots 5, whereby the angle of inclination of each displacement shaft 7 is made adjustable. Power rollers 8 are rotatably supported about the displacement shafts 7 supported by the trunnions 6. These power rollers 8 are sandwiched between the input side disc 2 and the output side disc 4. The inner sides 2a and 4a of the input side and output side discs 2 and 4 which are opposed to each other have their cross-sections forming concave surfaces obtained by an arc centering about the pivot 5 being rotated. The peripheral surfaces 8a of the power rollers 8 formed into spherical convex surfaces are made to bear against the above-mentioned inner sides 2a and 4a.

A loading cam type pressing device 9 is provided between the input shaft 1 and the input side disc 2, and by this pressing device 9, the input side disc 2 is resiliently pressed toward the output side disc 4. This pressing device 9 is comprised of a cam plate 10 rotatable with the input shaft 1, and a plurality of (e.g. four) rollers 12 held by a holder 11. A cam surface 13 which is an uneven surface extending in the circumferential direction is formed on one side (the left side as viewed in FIGS. 6 and 7) of the cam plate 10, and a similar cam surface 14 is also formed on the outer side (the right side as viewed in FIGS. 6 and 7) of the input side disc 2. The plurality of rollers 12 are supported for rotation about radial axes relative to the center of the input shaft 1.

When during the use of the toroidal type continuously variable transmission constructed as described above, the cam plate 10 is rotated with the rotation of the input shaft 1, the plurality of rollers 12 are pressed against the cam surface 14 on the outer side of the input side disc 2 by the cam surface 13. As a result, the input side disc 2 is pressed against the plurality of power rollers 8 and at the same time, the plurality of rollers 12 come into meshing engagement with the pair of cam surfaces 13 and 14, whereby the input side disc 2 is rotated. The rotation of this input side disc 2 is transmitted to the output side disc 4 through the plurality of power rollers 8, and the output shaft 3 fixed to this output side disc 4 is rotated.

When the rotational speed of the input shaft 1 and the output shaft 3 is to be changed and a speed reduction is to be effected between the input shaft 1 and the output shaft 3, the trunnions 6 are pivotally moved about the pivots 5 and the displacement shafts 7 are inclined so that as shown in FIG. 6, the peripheral surfaces of the power rollers may bear against that portion of the inner side 2a of the input side disc 2 which is toward the center and that portion of the inner side 4a of the output side disc 4 which is toward the outer periphery. When conversely, a speed increase is to be effected, the trunnions 6 are pivotally moved and the displacement shafts 7 are inclined so that as shown in FIG. 7, the peripheral surfaces 8a of the power rollers 8 may bear against that portion of the inner side 2a of the input side disc 2 which is toward the outer periphery and that portion of the inner side 4a of the output side disc 4 which is toward the center. If the angle of inclination of the displacement shafts 7 is made medium between FIG. 6 and FIG. 7, there will be obtained a medium transmission ratio between the input shaft 1 and the output shaft 3.

It is described in Japanese Laid-Open Patent Application Nos. 1-169169 and 1-312266 that when the toroidal type continuously variable transmission constructed and acting as described above is to be incorporated into a continuously variable transmission for an actual automobile, it is combined with a planetary gear mechanism. That is, during low speed running, the drive force of an engine is transmitted by only the toroidal type continuously variable transmission and during high speed running, the drive force is transmitted by the planetary gear mechanism, whereby a reduction in the torque applied to the toroidal type continuously variable transmission during high speed running may be achieved. With such a construction, the durability of each constituent member of the toroidal type continuously variable transmission can be improved.

In the case of the structure described in Japanese Laid-Open Patent Application Nos. 1-169169 and 1-312266, two sets of planetary gear mechanisms are incorporated and therefore, not only the structure becomes complicated and the cost runs up, but the installation space increases. Therefore, this structure is unsuitable as a continuously variable transmission for a small automobile or an FF vehicle which requires a transmission to be installed in a limited space near an engine room.

SUMMARY OF THE INVENTION

In view of such circumstances, it is an object of the present invention to provide a continuously variable transmission into which a single-stage double pinion type planetary gear mechanism is only incorporated, whereby a reduction in the torque transmitted through a toroidal type continuously variable transmission during high speed running can be achieved.

The continuously variable transmission of the present invention, like the continuously variable transmission described in each of the aforementioned publications, is provided with an input shaft connected to a drive source and rotatively driven by this drive source, an output shaft for taking out the power based on the rotation of the input shaft, a toroidal type continuously variable transmission and a single-stage double pinion type planetary gear mechanism.

The toroidal type continuously variable transmission changes the angle of inclination of a power roller sandwiched between an input side disc and an output side disc disposed concentrically with each other to thereby change the transmission ratio between the input side disc and the output side disc rotated on the basis of the rotation of the input shaft.

Also, the planetary gear mechanism comprises a planetary gear provided between a sun gear for rotating the output shaft and a ring gear disposed around the sun gear, and rotatably supported on a carrier rotatably supported concentrically with the sun gear, the planetary gear being brought into meshing engagement with the sun gear and the ring gear.

Particularly, in the continuously variable transmission of the present invention, the carrier and the output side disc are connected together so as to be capable of transmitting a rotational force by a first power transmitting mechanism, and the input shaft and the ring gear are made capable of being connected together so as to be capable of transmitting the rotational force by a second power transmitting mechanism. The continuously variable transmission further comprises a clutch mechanism for connecting the constituent member of the second power transmission to the ring gear and another clutch mechanism for connecting two of the constituent members of the planetary gear mechanism, one of the clutches being used for a forward drive.

The action of the continuously variable transmission of the present invention constructed as described above is as follows. First, during low speed running, the clutch mechanism is changed over so as to connect the carrier to the ring gear and to cut off the connection between the second power transmitting mechanism and the ring gear. In this state, only the toroidal type continuously variable transmission transmits power from the input shaft to the output shaft. The action itself when the transmission ratio between the input side and output side discs is changed during this low speed running is similar to that in the case of the prior-art toroidal type continuously variable transmission shown in FIGS. 6 and 7. Of course, in this state, the transmission ratio between the input shaft and the output shaft, i.e., the transmission ratio as the total continuously variable transmission, is proportional to the transmission ratio of the toroidal type continuously variable transmission. Also, in this state, the torque inputted to this toroidal type continuously variable transmission becomes equal to the torque applied to the input shaft.

In contrast, during high speed running, the clutch mechanism is changed over so as to connect the second power transmitting mechanism to the ring gear and to cut off the connection between the carrier and the ring gear. As a result, the planetary gear mechanism transmits power from the input shaft to the output shaft. Also, in this state, torque is transmitted from the carrier constituting this planetary gear mechanism to the output side disc of the toroidal type continuously variable transmission through the second power transmitting mechanism. In this state, the transmission ratio as the total continuously variable transmission varies in conformity with the speed of the revolution of the planetary gear. So, if the transmission ratio of the toroidal type continuously variable transmission is changed to thereby change the speed of the revolution of the planetary gear, the transmission ratio as the total continuously variable transmission can be adjusted. That is, in this state, the more the transmission ratio of the toroidal type continuously variable transmission is changed to the speed reduction side, the more the transmission ratio of the total continuously variable transmission changes to the speed increase side. In the state during such high speed running, the more the transmission ratio of the toroidal type continuously variable transmission is changed to the speed reduction side, the smaller becomes the torque inputted to this toroidal type continuously variable transmission. As a result, the torque inputted to the toroidal type continuously variable transmission during high speed running can be made small to thereby improve the durability of the constituent parts of the toroidal type continuously variable transmission.

As previously described, according to the prior art, two-stage planetary gear mechanisms have been incorporated, but according to the present invention, a single-stage double pinion type planetary gear mechanism is incorporated and therefore, the apparatus becomes lighter in weight and more compact.

When the toroidal type continuously variable transmission incorporated into the present invention is made into a single cavity toroidal type continuously variable transmission, a more remarkable effect will be obtained. The single cavity toroidal type continuously variable transmission requires support bearings such as angular bearings for receiving the reaction force of the input and output discs, but these bearings suffer from gear bearing dynamic torque loss. In the present invention, as previously described, the torque inputted to the toroidal portion can be made small and therefore, the bearing load can be decreased and the dynamic torque loss can be decreased to thereby improve the general efficiency.

Also, if the torque inputted to the toroidal portion becomes small, the dimension of the toroidal portion, the radial and axial dimensions of the support bearings or the like can be made very small and therefore, even when a planetary gear mechanism, a power transmitting mechanism (clutch), etc. are added, the apparatus becomes excellent in its mountability onto a vehicle and the lighter weight thereof can be achieved.

DESCRIPTION OF THE PREFERRED EMBODIMENTS

Figure 1:
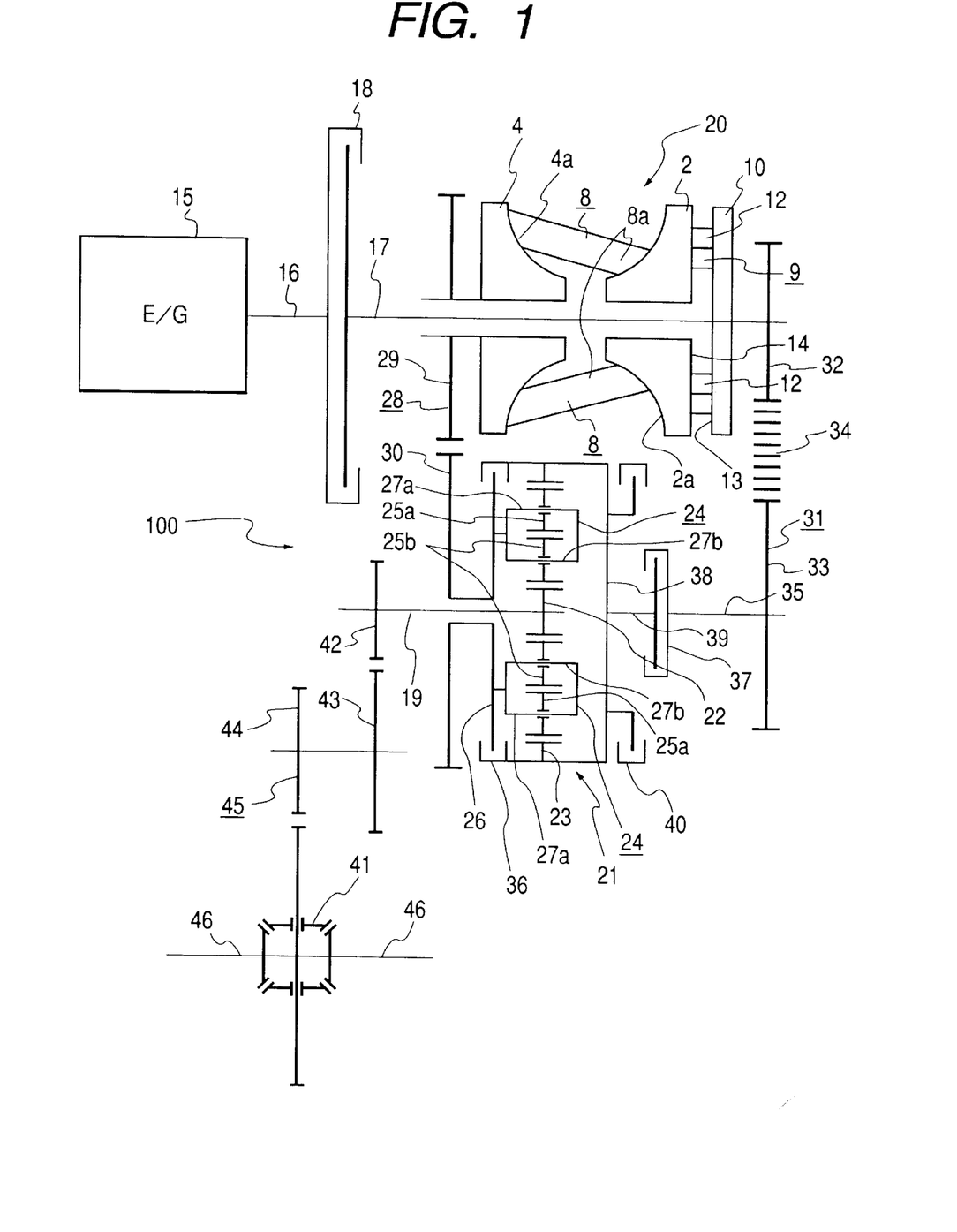
FIG. 1 is a schematic view showing a continuously variable transmission according to a first embodiment of the present invention.

FIG. 1 shows a first embodiment of the present invention. A continuously variable transmission 100 according to this embodiment is provided with an input shaft 17 connected to the crank shaft 16 of an engine 15 which is a drive source and rotatively driven by this engine 15. A starting clutch 18 is provided between the input side end portion (the left end portion as viewed in FIG. 1) of the input shaft 17 and the output side end portion (the right end portion as viewed in FIG. 1) of the crank shaft 16 in series with the crank shaft 16 and the input shaft 17. Accordingly, in the case of the present embodiment, the crank shaft 16 and the input shaft 17 are disposed concentrically with each other. In contrast, an output shaft 19 for taking out power based on the rotation of the input shaft 17 is disposed parallel to the input shaft 17. A toroidal type continuously variable transmission 20 is provided around the input shaft 17, and a single-stage double pinion type planetary gear mechanism 21 is provided around the output shaft 19.

A cam plate 10 constituting the toroidal type continuously variable transmission 20 is fixed to the intermediate portion toward the output side end portion (rightward as viewed in FIG. 1) of the input shaft 17. Also, an input side disc 2 and an output side disc 4 are supported about the input shaft 17 for independent rotation relative to the input shaft 17 by bearings, not shown, such as needle bearings. Rollers 12 are sandwiched between a cam surface 13 formed on one surface (the left surface as viewed in FIG. 1) of the cam plate 10 and a cam surface 14 formed on the outer side of the input shaft 2 to thereby constitute a pressing device 9. Accordingly, the input side disc 2 is rotated with the rotation of the input shaft 17 while being pressed toward the output side disc 4.

Also, a plurality of (usually two to three) power rollers 8 are sandwiched between the inner side 2a of the input side disc 2 and the inner side 4a of the output side disc 4, and the peripheral surfaces 8a of these power rollers 8 are brought into contact with the above-mentioned inner sides 2a and 4a. These power rollers 8 are rotatably supported by trunnions 6 and displacement shafts 7 (not shown in FIG. 1; see FIGS. 6 and 7). The toroidal type continuously variable transmission 20, like the heretofore widely known toroidal type continuously variable transmission, changes the transmission ratio between the input side disc 2 and the output side disc 4 by pivotally moving the trunnions 6 and changing the angle of inclination of the displacement shafts 7 supporting the power rollers 8.

Also, a sun gear 22 constituting the planetary gear mechanism 21 is fixed to the input side end portion (the right end portion as viewed in FIG. 1) of the output shaft 19. Accordingly, this output shaft 19 is rotated with the rotation of the sun gear 22. A ring gear 23 is rotatably supported around the sun gear 22 concentrically with the sun gear 22. A plurality of (usually three) planetary gear sets 24 are provided between the inner peripheral surface of the ring gear 23 and the outer peripheral surface of the sun gear 22. In the illustrated embodiment, these planetary gear sets 24 each comprise a combination of a pair of planetary gears 25a and 25b. These pairs of planetary gears 25a and 25b mesh with each other, and the planetary gear 25a disposed on the outer diameter side is brought into meshing engagement with the ring gear 23 and the planetary gear 25b disposed on the inner diameter side is brought into meshing engagement with the sun gear 22. It is for making the directions of rotation of the ring gear 23 and the sun gear 22 coincident with each other that each planetary gear set 24 is constituted by a pair of planetary gears 25a and 25b, as described above. Accordingly, if from the relation with other constituent portions, it is not necessary to make the directions of rotation of the ring gear 23 and the sun gear 22 coincident with each other, a single planetary gear may be brought into meshing engagement with both of the ring gear 23 and the sun gear 22.

The planetary gear sets 24 as described above are rotatably supported on one side (the right side as viewed in FIG. 1) of a carrier 26 by pivots 27a and 27b parallel to the output shaft 19. The carrier 26 is rotatably supported on the intermediate portion of the output shaft 19 by a bearing, not shown, such as a needle bearing.

Also, the carrier 26 and the output side disc 4 are connected together so as to be capable of transmitting a rotational force by a first power transmitting mechanism 28. This first power transmitting mechanism 28 is comprised of first and second gears 29 and 30 meshing with each other. That is, the first gear 29 is fixed to the outer side (the left side as viewed in FIG. 1) of the output side disc 4 concentrically with the output side disc 4, and the second gear 30 is fixed to one side (the left side as viewed in FIG. 1) of the carrier 26 concentrically with this carrier 26. Accordingly, the carrier 26 is rotated at a speed corresponding to the number of teeth of the first and second gears 29 and 30 in a direction opposite to the direction of rotation of the output side disc 4 with the rotation of this output side disc 4.

On the other hand, the input shaft 17 and the ring gear 23 can be connected together so as to be capable of transmitting a rotational force by a second power transmitting mechanism 31. This second power transmitting mechanism 31 is comprised of first and second sprockets 32 and 33, and a chain 34 extended between these two sprockets 32 and 33. That is, the first sprocket 32 is fixed to the output side end portion (the right end portion as viewed in FIG. 1) of the input shaft 17 which protrudes from the cam plate 10, and the second sprocket 33 is fixed to the input side end portion (the right end portion as viewed in FIG. 1) of a transmitting shaft 35. This transmitting shaft 35 is disposed concentrically with the output shaft 19 and is rotatably supported by a bearing, not shown, such as an antifriction bearing. Accordingly, the transmitting shaft 35 is rotated at a speed corresponding to the number of teeth of the first and second sprockets 32 and 33 in the same direction as the input shaft 17 with the rotation of this input shaft 17.

Also, the continuously variable transmission 100 according to the present embodiment is provided with a clutch mechanism. This clutch mechanism connects only one of the carrier 26 and the transmitting shaft 35 which is a constituent member of the second power transmitting mechanism 31 to the ring gear 23. In the case of the present embodiment, this clutch mechanism comprises a clutch 36 for low speed and a clutch 37 for high speed. The clutch 36 for low speed is provided between the outer peripheral edge portion of the carrier 26 and one axial end portion (the left and portion as viewed in FIG. 1) of the ring gear 23. Also, the clutch 37 for high speed is provided between the transmitting shaft 35 and a central shaft 39 fixed to the ring gear 23 through a support plate 38. The clutch 36 for low speed and the clutch 37 for high speed are controlled by a control circuit (not shown) hydraulically or electrically operated so that when one of these clutches is connected, the other clutch may be disconnected.

Also, in the illustrated embodiment, a clutch 40 for backward movement is provided between the ring gear 23 and a fixed portion such as the housing (not shown) of the continuously variable transmission 100. This clutch 40 for backward movement is provided to rotate the output shaft 19 in the opposite direction to move an automobile backward. This clutch for backward movement is disconnected when one of the clutch 36 for low speed and the clutch 37 for high speed is connected. Also, when this clutch 40 for backward movement is connected, both of the clutch 36 for low speed and the clutch 37 for high speed are disconnected. That is, except the starting clutch 18, the remaining three clutches 36, 37 and 40 are such that when one of them is connected, the remaining two clutches are disconnected.

Further, in the illustrated embodiment, the output shaft 19 and a differential gear 41 are connected together by a third power transmitting mechanism 45 comprised of third to fifth gears 42–44. Accordingly, when the output shaft 19 is rotated, a pair of right and left drive shafts 46 are rotated through the third power transmitting mechanism 45 and the differential gear 41 to thereby rotatively drive the drive wheels of the automobile, not shown.

The action of the continuously variable transmission according to the present embodiment constructed as described above is as follows. First, during low speed running, the clutch 36 for low speed is connected and the clutch 37 for high speed and the clutch 40 for backward movement are disconnected. When in this state, the starting clutch 18 is connected and the input shaft 17 is rotated, only the toroidal type continuously variable transmission 20 transmits power from the input shaft 17 to the output shaft 19. That is, with the connection of the clutch 36 for low speed, the ring gear 23 and the carrier 26 are integrally coupled together and the relative rotation of the gears 22, 23, 25a and 25b constituting the planetary gear mechanism 21 becomes impossible. Also, by the clutch 37 for high speed and the clutch 40 for backward movement being disconnected, the ring gear 23 becomes rotatable independently of the rotational speed of the transmitting shaft 35.

Accordingly, when in this state, the input shaft 17 is rotated, this rotation is transmitted to the input side disc 2 through the pressing device 9, and is further transmitted to the output side disc 4 through the plurality of power rollers 8. The rotation of this output side disc 4 is transmitted to the carrier 26 and the ring gear 23 through the first and second gears 29 and 30 constituting the first power transmitting mechanism 28. As described above, in this state, the relative rotation of the gears 22, 23, 25a and 25b constituting the planetary gear mechanism 21 is impossible and therefore, the output shaft 19 is rotated at the same speed as the carrier 26 and the ring gear 23.

Figure 4:
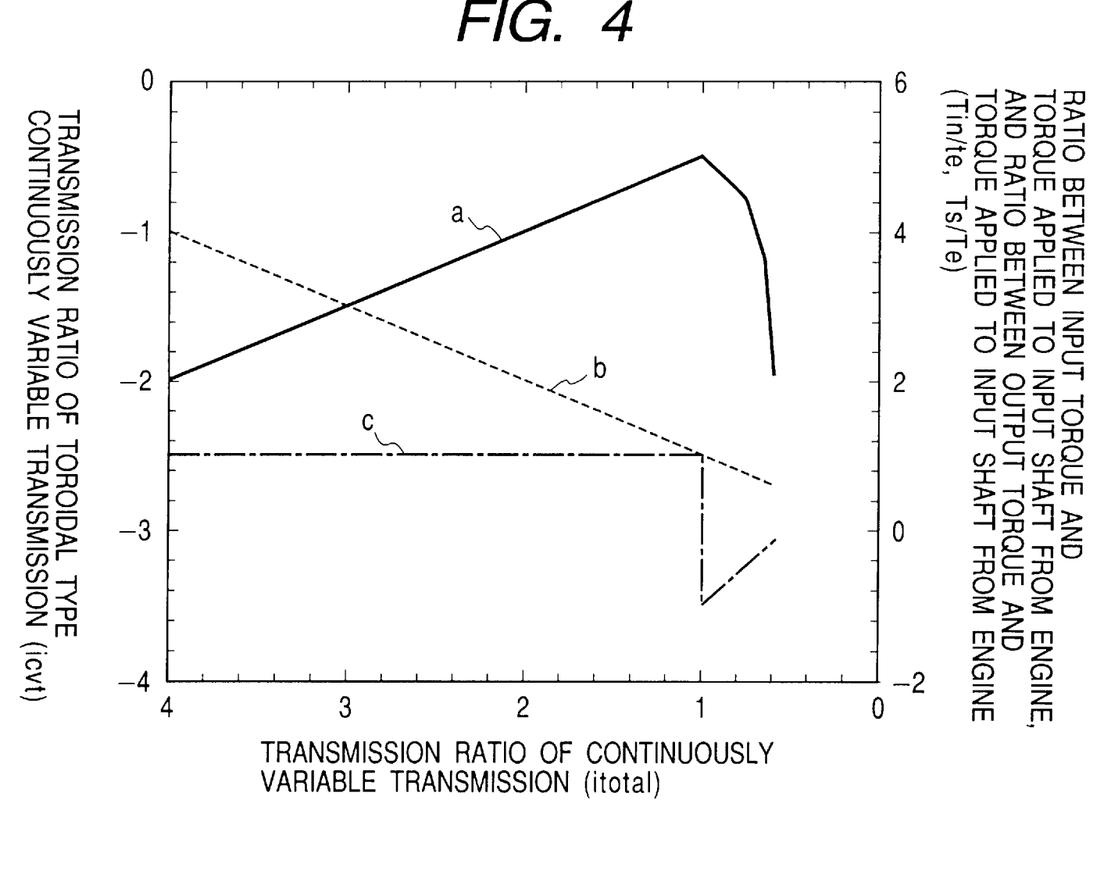
FIG. 4 is a graph showing the relations among the transmission ratio of a toroidal type continuously variable transmission and the transmission ratio as the total continuously variable transmission and an input torque and an output torque.
Figure 5:
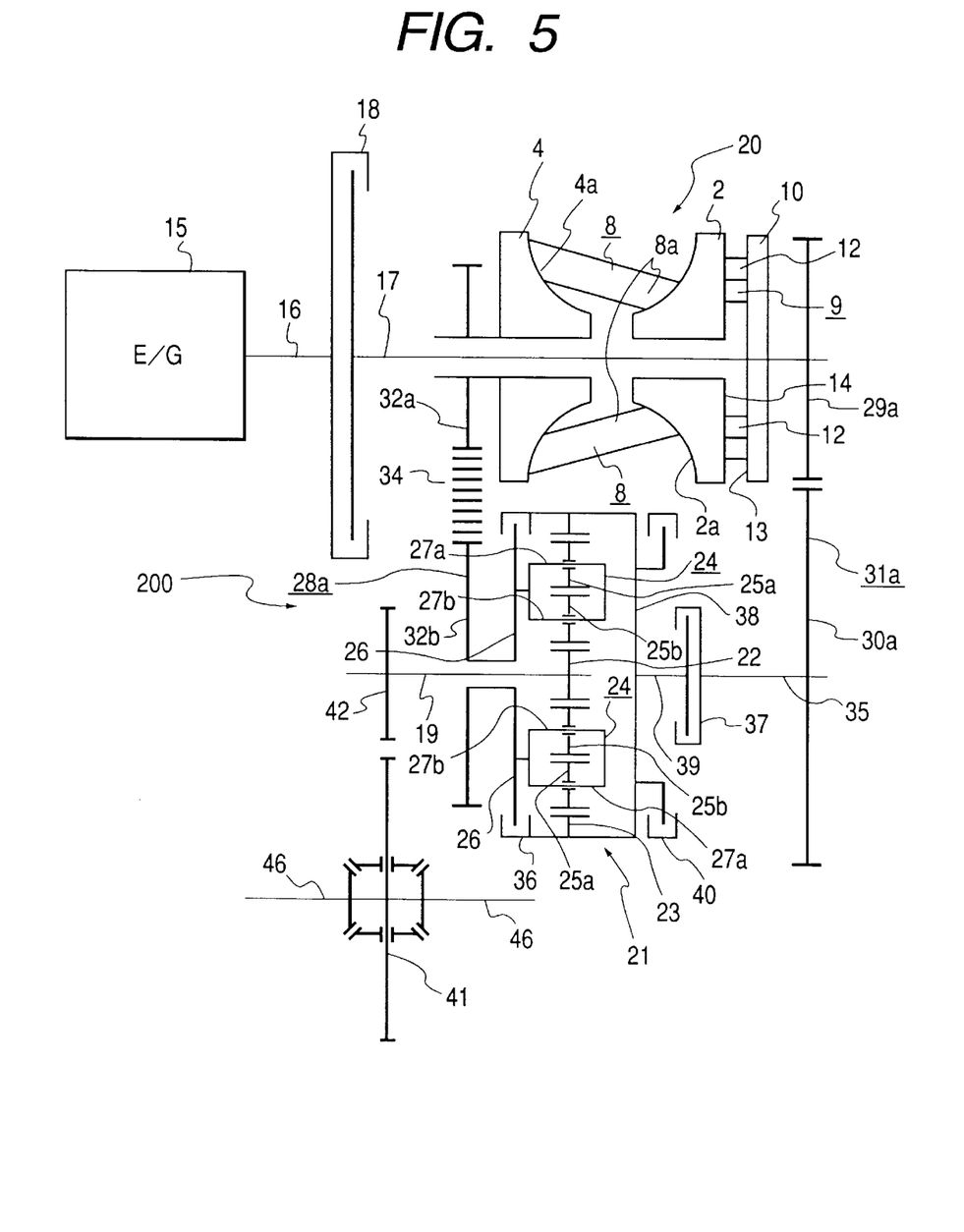
FIG. 5 is a schematic view showing a continuously variable transmission according to a second embodiment of the present invention.

The action itself when the transmission ratio between the input side and output side disc 2 and 4 is changed during such low speed running is similar to that in the case of the prior-art toroidal type continuously variable transmission shown in FIGS. 4 and 5. Of course, in this state, the transmission ratio between the input shaft 17 and the output shaft 19, i.e., the transmission ratio as the total continuously variable transmission, is proportional to the transmission ratio of the toroidal type continuously variable transmission. Also, in this state, a torque inputted to this toroidal type continuously variable transmission 20 becomes equal to a torque applied to the input shaft 17. During low speed running, the first and second sprockets 32 and 33 and chain 34 constituting the second power transmitting mechanism 31 only rotate idly.

In contrast, during high speed running, the clutch 37 for high speed is connected and the clutch 36 for low speed and the clutch 40 for backward movement are disconnected. When in this state, the starting clutch 18 is connected and the input shaft 17 is rotated, the first and second sprockets 32 and 33 and chain 34 constituting the second power transmitting mechanism 31 and the planetary gear mechanism 21 transmit power from the input shaft 17 to the output shaft 19.

That is, when during the high speed running, the input shaft 17 is rotated, this rotation is transmitted to the central shaft 39 through the second power transmitting mechanism 31 and the clutch 37 for high speed to thereby rotate the ring gear 23 to which the central shaft 39 is fixed. The rotation of this ring gear 23 in turn is transmitted to the sun gear 22 through the plurality of planetary gear sets 24 to thereby rotate the output shaft 19 to which the sun gear 22 is fixed. Assuming that when the ring gear 23 has become the input side, the planetary gear sets 24 are stopped (do not revolve around the sun gear 22), the planetary gear mechanism 21 effects speed increase at a transmission ratio conforming to the ratio between the numbers of teeth of the ring gear 23 and the sun gear 22. However, each of the planetary gear sets 24 revolves around the sun gear 22, and the transmission ratio as the total continuously variable transmission changes in conformity with the speed of revolution of these planetary gear sets 24. So, if the transmission ratio of the toroidal type continuously variable transmission 20 is changed to thereby change the speed of revolution of the planetary gear sets 24, the transmission ratio as the total continuously variable transmission can be adjusted.

That is, in the illustrated embodiment, during the high speed running, each planetary gear set 24 revolves in the same direction as the ring gear 23. The higher is the speed of revolution of these planetary gear sets 24, the higher becomes the rotational speed of the output shaft 19 to which the sun gear 22 is fixed. If for example, the speed of revolution and the rotational speed of the ring gear 23 (both are angular speeds) become equal to each other, the rotational speeds of the ring gear 23 and the output shaft 19 become equal to each other. In contrast, if the speed of revolution is lower than the rotational speed of the ring gear 23, the rotational speed of the output shaft 19 becomes higher than the rotational speed of the ring gear 23. If conversely, the speed of revolution is higher than the rotational speed of the ring gear 23, the rotational speed of the output shaft 19 becomes lower than the rotational speed of the ring gear 23.

Accordingly, during the high speed running, the more is changed to the deceleration side the transmission ratio of the toroidal type continuously variable transmission 20, the more is changed to the acceleration side the transmission ratio of the total continuously variable transmission. In such a state during the high speed running, torque is applied not from the input side disc 2 but from the output side disc 4 to the toroidal type continuously variable transmission 20 (when the torque applied during low speed running is plus torque, minus torque is applied). That is, when the clutch 37 for high speed is in its connected state, the torque transmitted from the engine 15 to the input shaft 17 is transmitted to the ring gear 23 of the planetary gear mechanism 21 through the second power transmitting device 31 before the pressing device 10 presses the input side disc 2. Accordingly, the torque transmitted from the input shaft 17 side to the input side disc 2 through the pressing device 10 becomes almost null.

Also, part of the torque transmitted to the ring gear 23 of the planetary gear mechanism 21 through the second power transmitting device 31 is transmitted from each planetary gear set 24 to the output side disc 4 through the carrier 26 and the first power transmitting mechanism 28. As described above, the torque applied from the output side disc 4 to the toroidal type continuously variable transmission 20 becomes smaller as the transmission ratio of the toroidal type continuously variable transmission 20 is changed to the deceleration side to change the transmission ratio of the total continuously variable transmission to the acceleration side. As a result, the torque inputted to the toroidal type continuously variable transmission 20 during high speed running can be made small to thereby improve the durability of the constituent parts of the toroidal type continuously variable transmission 20.

In the above-described arrangement the planetary gears are directly connected to each other and they simultaneously rotate. Not departing from such arrangement, other modifications are possible. For example, FIG. 2 shows one modification of the first embodiment, in which the sun gear 22 is connected to the carrier 26 and FIG. 3 shows another modification of the first embodiment, in which the sun gear 22 is connected to the ring gear 23.

Figure 2:
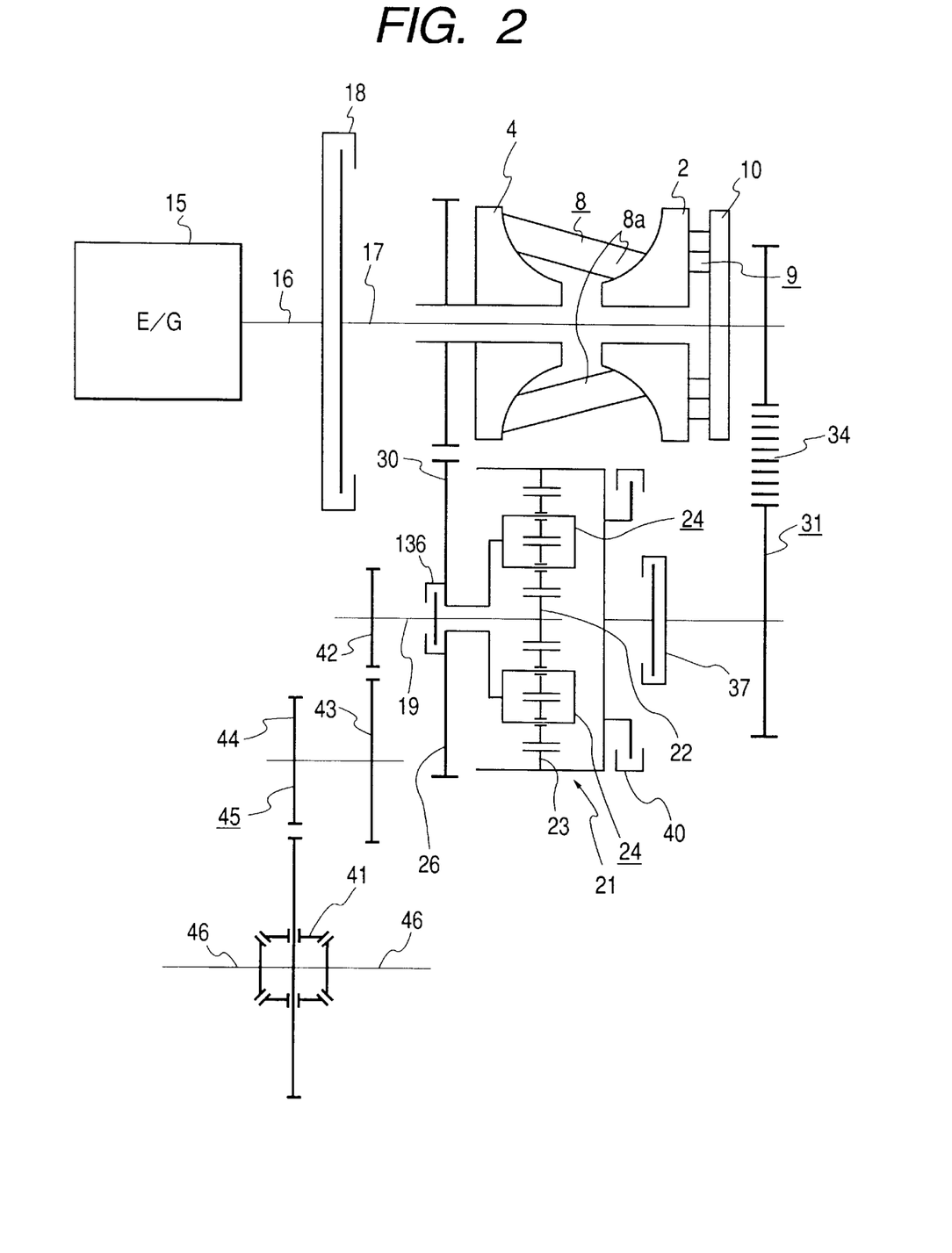
FIG. 2 is a schematic view showing a continuously variable transmission according to one modification of the first embodiment of the present invention.

In the modification as shown in FIG. 2 a clutch 136 for low speed is provided on the output shaft 19 and connected to the carrier 26. Also, in FIG. 3 a clutch 236 for low speed is provided on the output shaft 19 in the planetary gear mechanism 21.

Figure 3:
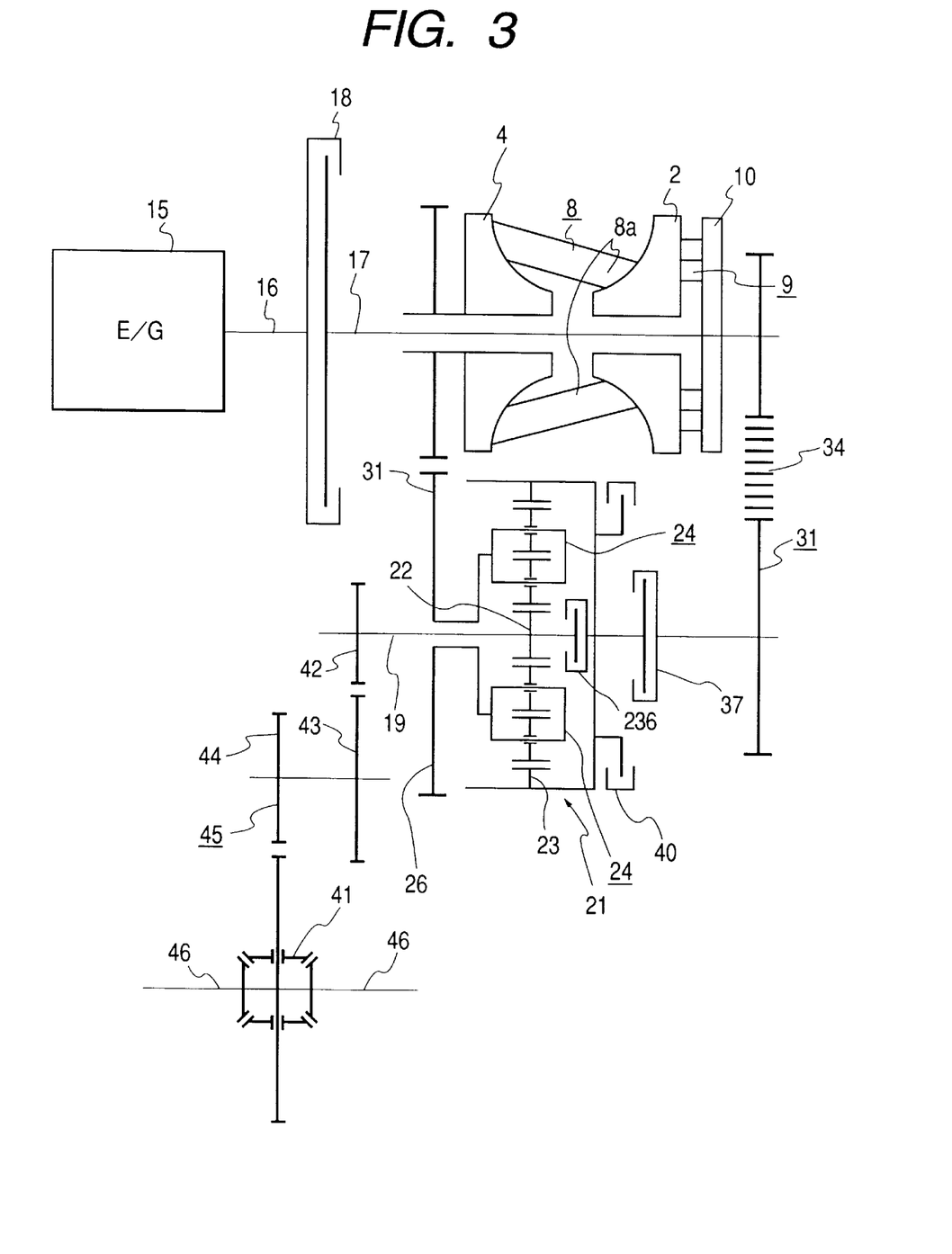
FIG. 3 is a schematic view showing a continuously variable transmission according to another modification of the first embodiment of the present invention.

It should be noted that the modifications as shown in FIGS. 2 and 3 may be applied to the second embodiment which will be described hereinafter.

Further, in the structure shown in FIG. 1, when the output shaft 19 is to be rotated in the opposite direction to move the automobile backward, the clutches 36 and 37 for low speed and high speed are disconnected and the clutch 40 for backward movement is connected. As a result, the ring gear 23 is fixed and the planetary gear sets 24 revolve around the sun gear 22 while meshing with the ring gear 23 and the sun gear 22. As a result, the sun gear 22 and the output shaft 19 to which the sun gear 22 is fixed rotate in the direction opposite to that during the aforedescribed high speed running and during the above-described low speed running.

FIG. 4 shows an example of a state in which when in the above-described structure of the first embodiment, the transmission ratio (itotal) as the total continuously variable transmission is continuously changed, the transmission ratio (icvt) of the toroidal type continuously variable transmission 20, the input torque ($T_{in}$) inputted to this toroidal type continuously variable transmission 20 and the output torque ($T_s$) taken out from the output shaft 19 of the continuously variable transmission change. The relation between these transmission ratios (itotal), (icvt) and the torques ($T_{in}$), ($T_s$) changes in conformity with the transmission width of the toroidal type continuously variable transmission 20, the structure and the tooth number ratio of the planetary gear mechanism 21, the reduction ratio of the second power transmitting device 31, etc. The values of these and the structure are determined in design when the present invention is carried out. As the condition for obtaining each line shown in FIG. 4, calculation was done on the assumption that the transmission width of the toroidal type continuously variable transmission 20 is about 4 times (0.5–2.0), the planetary gear mechanism 21 is provided with planetary gear sets 24 each comprising a pair of planetary gears 25$a$ and 25$b$, and the reduction ratio of the second power transmitting device 31 is about 2. Also, it was assumed that the changeover of the clutch 36 for low speed and the clutch 37 for high speed was effected when the transmission ratio (itotal) as the total continuously variable transmission was 1.

When an actual continuously variable transmission is to be constructed, if design is made such that the changeover of the clutch 36 for low speed and the clutch 37 for high speed is effected whenever the transmission ratio (itotal) as the total continuously variable transmission is 1, the changeover of these two clutches 36 and 37 will take place frequently when the vehicle is running at the transmission ratio (itotal) of about 1. Such circumstances not only give a feeling of physical disorder to the driver, but also adversely affect the durability of the clutches 36 and 37. Accordingly, when an actual continuously variable transmission is to be constructed, provision is made of so-called hysteresis which changes the timing of the changeover of the clutches 36 and 37 when the transmission ratio (itotal) becomes high and when the transmission ratio (itotal) becomes low. For example, the timing of the changeover when the value of the transmission ratio (itotal) becomes smaller (the value of the transmission ratio changes from the left to right of FIG. 4) is defined as a point of time (the right side in FIG. 4) at which the value of the transmission ratio is smaller than at the timing when this value becomes greater (the value of the transmission ratio changes from the right to left of FIG. 4).

In FIG. 4 showing the result of the trial calculation effected under the condition as described above, the axis of ordinate represent the transmission ratio (icvt) of the toroidal type continuously variable transmission 20 and the ratio ($T_{in}/T_e$) ($T_s/T_e$) between the input torque ($T_{in}$) of the toroidal type continuously variable transmission 20 or the output torque ($T_s$) of the continuously variable transmission and the torque ($T_e$) transmitted from the engine 15 (FIG. 1) to the input shaft 17, and the axis of abscissas represents the transmission ratio (itotal) as the total continuously variable transmission. It is because the direction of rotation of the output side disc 4 incorporated in the toroidal type continuously variable transmission 20 is opposite to the direction of rotation of the input shaft 17 that the value indicative of the transmission ratio (icvt) of the toroidal type continuously variable transmission 20 is minus. Also, solid line a represents the transmission ratio (icvt) of the toroidal type continuously variable transmission 20, broken line b represents the ratio ($T_s/T_e$) between the output torque ($T_s$) and the torque ($T_e$) transmitted from the engine 15 to the input shaft 17, and dot-and-dash line c represents the ratio ($T_{in}/T_e$) between the input torque ($T_{in}$) and the torque ($T_e$) transmitted from the engine 15 to the input shaft 17. As is apparent from such showing of FIG. 4, according to the continuously variable transmission 100 of the present embodiment, the torque applied to the toroidal type continuously variable transmission during high speed running can be made small. Under the condition under which FIG. 4 was obtained, the input torque ($T_{in}$) can at maximum be reduced to the order of 14% of the torque ($T_e$) transmitted from the engine 15 to the input shaft 17.

FIG. 5 shows a continuously variable transmission 200 according to a second embodiment of the present invention. In the case of the present embodiment, a first power transmitting mechanism 28$a$ provided between the output side disc 4 and the carrier 26 is comprised of first and second sprockets 32$a$ and 32$b$ and a chain 34 extended between these two sprockets 32$a$ and 32$b$. Also, a second power transmitting mechanism 31$a$ provided between the input shaft 17 and the transmitting shaft 35 is comprised of first and second gears 29$a$ and 30$a$ meshing with each other. Thus, the constituent parts of the first power transmitting mechanism 28$a$ and the constituent parts of the second power transmitting mechanism 31$a$ are made converse to the case of the aforedescribed first embodiment, whereby the direction of rotation of the output shaft 19 becomes opposite to that in the case of the first embodiment. So, in the case of the second embodiment, a third gear 42 fixed to the end portion of the output shaft 19 is directly brought into meshing engagement with the input portion of a differential gear 41 so that the direction of rotation of this differential gear 41 may coincide with that in the case of the above-described first embodiment. In the other points, the construction and action of the second embodiment are similar to those of the aforedescribed first embodiment and therefore, like portions are given like reference numerals and need not be described.

While in the above-described first and second embodiments, a single cavity toroidal type continuously variable transmission is used as the toroidal type continuously variable transmission used in the continuously variable transmission, use can of course be made of a dual cavity toroidal type continuously variable transmission.

The present invention is constructed and acts as described above and therefore, the load applied to the constituent parts of the toroidal type continuously variable transmission incorporated in the continuously variable transmission can be mitigated to thereby improve the durability of the constituent parts.

However, when a single cavity toroidal type continuously variable transmission is used, a continuously variable transmission particularly suitable for an FF vehicle (front wheel drive vehicle) which is required to be compact and light in weight can be provided due to the combined effect of the fact that a single planetary gear mechanism is used.

What is claimed is:

1. A continuously variable transmission provided with an input shaft connected to a drive source and rotatively driven by said drive source, an output shaft for taking out power based on the rotation of said input shaft, a toroidal type continuously variable transmission and a single-stage double pinion type planetary gear mechanism, said toroidal type continuously variable transmission being for changing the angle of inclination of a power roller sandwiched between an input side disc and an output side disc disposed concentrically with each other to thereby change the transmission ratio between said input side disc and said output side disc rotated on the basis of the rotation of said input shaft, said planetary gear mechanism comprising a planetary gear provided between a sun gear for rotating said output shaft and a ring gear disposed around said sun gear and rotatably supported on a carrier rotatably supported concentrically with said sun gear, said planetary gear being brought into meshing engagement with said sun gear and said ring gear, characterized in that said carrier and said output side disc are connected together so as to be capable of transmitting a rotational force by a first power transmitting mechanism, and said input shaft and said ring gear being made capable of being connected together so as to be capable of transmitting the rotational force by a second power transmitting mechanism, and said continuously variable transmission further comprises a clutch mechanism for connecting the constituent member of said second power transmission to said ring gear and another clutch mechanism for connecting two of the constituent members of said planetary gear mechanism, one of said clutches being used for a forward drive.

2. The continuously variable transmission of claim 1, wherein said toroidal type continuously variable transmission is a single cavity toroidal type continuously variable transmission, and said planetary gear mechanism and said single cavity toroidal type continuously variable transmission are disposed so that their axes may be parallel to each other.

* * * * *